United States Patent [19]

Murrell et al.

[11] 3,980,589

[45] Sept. 14, 1976

[54] METHOD FOR PREPARING A CATALYST COMPRISING RUTHENIUM SUPPORTED ON A GROUP IIA OXIDE

[75] Inventors: Lawrence Lee Murrell, Elizabeth; David J. C. Yates, Westfield, both of N.J.

[73] Assignee: Exxon Research and Engineering Company, Linden, N.J.

[22] Filed: June 3, 1975

[21] Appl. No.: 583,507

[52] U.S. Cl. .......................... 252/466 PT; 252/473
[51] Int. Cl.² ..................... B01J 23/46; B01J 23/58
[58] Field of Search ..................... 252/473, 466 PT

[56] References Cited
UNITED STATES PATENTS

| | | | |
|---|---|---|---|
| 3,748,280 | 7/1973 | Billings et al. | 252/430 |
| 3,819,536 | 6/1974 | Dalla Betta et al. | 252/473 X |
| 3,840,389 | 10/1974 | Kobylinski et al. | 252/439 X |
| 3,849,343 | 11/1974 | Hoekstra | 252/473 X |

*Primary Examiner*—Patrick P. Garvin
*Assistant Examiner*—William L. Wright
*Attorney, Agent, or Firm*—R. J. Baran

[57] ABSTRACT

This invention relates to a method for making supported ruthenium catalysts more specifically to a method for preparing supported ruthenium catalysts, which are characterized as having the ruthenium present in high surface area. The support utilized in preparing said catalyst is selected from the group consisting of porous oxides selected from Group IIA of the Periodic Table of the Elements. Preferably the Group IIA oxide is magnesium oxide.

9 Claims, No Drawings

METHOD FOR PREPARING A CATALYST COMPRISING RUTHENIUM SUPPORTED ON A GROUP IIA OXIDE

CROSS REFERENCE TO RELATED CASES

This patent application is related to U.S. Ser. No 583,508, filed on the same day herewith, in the names of L. L. Murrell, J. P. DeLuca and G. B. McVicker, which claims certain of the catalysts prepared by the process of the instant invention, and is hereby incorporated by reference to support the preferred embodiment claimed herein.

THE FIELD OF THE INVENTION

This invention relates to a method for making supported ruthenium catalysts more specifically to a method for preparing supported ruthenium catalysts, which are characterized as having the ruthenium present in high surface area. The support utilized in preparing said catalyst is selected from the group consisting of porous oxides selected from Group IIA of the Periodic Table of the Elements. Preferably the Group IIA oxide is magnesium oxide. The Group IIA oxide should have a surface area of at least 1.0 meters$^2$/gram, more preferably, a surface area of greater than 100 meters$^2$/gram. The catalysts are especially useful in processes for the reduction of nitric oxide present in automobile exhaust gases and the off gases from stationary combustion sources.

The method of the instant invention comprises contacting a porous Group IIA oxide material with a ruthenium precursor dissolved in a non-aqueous solvent. The volume of non-aqueous solvent that is present during this contacting step is maintained in an amount in excess of the volume necessary to fill the pores of said porous Group IIA oxide. The contacting conditions are adjusted so that substantially all of said precursor present in said non-aqueous solvent is adsorbed onto said Group IIA oxide and the non-aqueous solvent is removed, for example, by volatilization, vacuum, etc. The catalyst is then activated by reducing said precursor to ruthenium metal, e.g. at a temperature of greater than 200°C, more preferably 400° to 500°C in a hydrogen atmosphere.

THE BACKGROUND OF THE PRIOR ART

In U.S. Pat. No. 3,840,389, a process for preparing catalysts for reduction of nitric oxide is taught. These catalysts include as the active component, ruthenium as well as palladium, platinum, rhodium, osmium, and iridium. The patentee teaches that the active component can be supported on any refractory oxide support, including alumina, silica, magnesia, thoria, titania, zirconia, silica-alumina, silica-zirconia, magnesia-alumina, as well as carbon, pumice and other clays, including natural and synthetic clays. The patentee teaches the equivalence of all of these support materials and only uses alumina in his examples. The novelty of the patentee's invention resides in maintaining the impregnating solution at an acidic pH of from 0.7 to 2.2. The patentee teaches that his impregnating solution may be aqueous or an alcoholic solution substituted therefor. However, because the patentee teaches us that it is critical to maintain the acidity of his impregnating solution in a 0.7 to 2.2 pH range, it is necessary that some water must be present even in the alcoholic impregnating solutions taught. The patentee only uses aqueous inpregnation techniques in his examples and nowhere teaches, shows or suggests that the use of alcohol alone would provide an improved catalyst.

The patentee, because he never actually used magnesia or magnesia-alumina as a support material, also failed to recognize that catalysts using these support materials could not be prepared by aqueous impregnation wherein the active components, especially ruthenium, is in a well dispersed state. It has now been found that when aqueous ruthenium containing solutions are used to impregnate magnesia, magnesia-alumina or other Group IIA oxide supports, the following results occur, none of which were recognized by the patentee.

1. At the pH utilized by the patentee, magnesium oxide will be attacked by the impregnating solution, dissolve to some extent, and thus raise the pH.
2. The ruthenium component, because of the increase of pH will precipitate out of solution onto the magnesia as large aggregates of ruthenium complexes.
3. Reduction of the large aggregates, to activate the catalyst, yields large aggregates of ruthenium metal which have a low surface area and consequently low catalytic activity.

The patentee also teaches that corrugated ceramic material commonly known as monoliths may be used as catalyst supports. The patentee's technique, which is an impregnation technique, does not give a uniform distribution of high surface area ruthenium on supports of this type, particularly when magnesia or any other Group IIA oxide is one of the components of the monolith which is accessible to the impregnating solution.

SUMMARY OF THE INVENTION

It has now been unexpectedly discovered that a catalyst comprising ruthenium supported on a porous Group IIA oxide, wherein the ruthenium is characterized as having a high surface area, for example, at least 25 percent, or preferably 50–100 percent dispersion or more preferably 90–100 percent dispersion can be prepared by contacting said Group IIA oxide with a non-aqueous solution, comprising a ruthenium precursor dissolved in a non-aqueous solvent, the volume of said solution being maintained during said contacting in excess of the volume necessary to fill the pores of said Group IIA oxide, and said contacting being carried out at conditions whereby substantially all of said precursor present in said non-aqueous solution is absorbed onto said Group IIA oxide, removing said non-aqueous solvent and reducing said ruthenium component precursor to ruthenium metal.

The dispersion of the ruthenium is defined as 450 meters$^2$/gram ruthenium at 100 percent dispersion, and may be measured by standard hydrogen and carbon monoxide chemisorption techniques.

Preferably, the support is magnesium oxide. In general, the Group IIA oxide will have a surface area of at least 1.0 meters$^2$/gram preferably at least 100 meters$^2$/gram. In a preferred embodiment the support is magnesia, supported on an alumina wash-coated monolith. Materials of this type are useful as automobile exhaust catalysts for the removal of $NO_x$.

In the method of the instant invention the choice of a non-aqueous solvent is critical for the contacting step. The solvent must be incapable of reacting with the Group IIA oxide, especially magnesium oxide under the contacting conditions at which the adsorption takes place. For this reason, aqueous solvents and especially acidic solvents must be avoided, since these solvents will react with magnesium oxide and dissolve the magnesium oxide into the solvent phase. This dissolution will raise the pH of the adsorption solution and may, if a sufficient increase in pH is obtained, precipitate out the ruthenium component precursor as large aggregates, which as noted above yield low surface area ruthenium upon reduction. The loss of magnesium hydroxide from the support surface also decreases the effectiveness of the final catalyst.

The solvent of course must be capable of dissolving the ruthenium component precursor at the levels necessary for the adsorption. However, because the instant invention comprises an adsorption process rather than, as in the prior art, an impregnation process, the solubility of ruthenium component in said solvent may be very low and yet said solvent will still be useful. For example, in an adsorption process wherein the ruthenium component precursor is adsorbed from solution rather than impregnated onto the support, a large volume of non-aqueous solvent may be used, for example, the amount of non-aqueous solvent may be two times or more the volume required to fill the pores of Group IIA oxide support and volumes of up to 100 times the volume necessary to fill the pores of the support may be conveniently used. In an impregnation process the volume of the solution is adjusted to be approximately equal to the volume of the pores.

In the preferred embodiment wherein the Group IIA oxide especially magnesium oxide, is supported on an alumina wash-coated monolith, the volume can be adjusted so that the entire monolith may be submerged in the adsorption solution. In this manner uniform adsorption of the ruthenium onto the monolith is obtained. It should be noted the prior art impregnation techniques are especially deficient in preparing ruthenium catalysts wherein the ruthenium is supported on a monolith.

The adsorption is carried out until substantially all the ruthenium has been removed from the solution and deposited onto the Group IIA oxide support. The adsorption may be monitored by decolorization of the ruthenium precursor containing non-aqueous solution since most ruthenium component precursors are highly colored. Analysis of the non-aqueous solution can be carried out by means known in the art to determine if any ruthenium remains dissolved in the solution.

During the adsorption step of the method of the instant invention, conditions are adjusted so that the ruthenium component precursor adsorbs onto Group IIA oxide at a convenient rate. The pressure and temperature of course will be adjusted so that a substantial amount of solvent is not lost during the adsorption step, since loss of solvent may cause the ruthenium component precursor to deposit onto the support because of its lack of solubility in a diminishing voluumee of solvent. Also, the loss of solvent during adsorption could cause poor distribution of the ruthenium onto the Group IIA support. Solvent loss is especially to be avoided when the Group IIA oxide is supported on a monolith. The adsorption step may be carried out for a time of at least 5 minutes, preferably 120 to 1080 minutes and the temperature may be conveniently ambient, although any temperature below the boiling point of the solvent may be used.

Specific non-limiting examples of solvents which can be used in preparing the ruthenium precursor solution include aldehydes, ketones, ethers, organic nitrogen bases including nitriles, amines, etc. These solvents must be liquid at the temperature at which the adsorption takes place. Specific solvents which are useful in the ruthenium precursor solution used in the method of the instant invention include acetone, acetonitrile, N,N-dimethylformamide, hexamethylphosphoramide, diethylether, tetrahydrofuran, dioxane, methyl ethyl ketone, acetaldehyde, etc.

The ruthenium precursor as stated above must be to some extent soluble in non-aqueous solvent of choice. Ruthenium salts, complexes, and organometallics containing ruthenium may be used as the catalyst component precursor. The use of salts, complexes, and organometallics containing sulfur, phosphorus, or arsenic, which may stay behind upon subsequent reduction of the ruthenium precursor and deactivate or reduce the activity of the catalyst, should be avoided. Specific examples of ruthenium precursors include ruthenium trichloride, ruthenium nitrosyl nitrate, ruthenium carbonyl, etc.

The next step in the method of the instant invention comprises removing the solvent from the catalyst support which now contains ruthenium adsorbed thereto. The removal of the solvent may be done by means known in the art, for example, volatilization, with or without vacuum; decantation, followed by heating to remove the solvent remaining in the pores of the support, etc. The preferred methods for removing the solvent comprises purging with an inert gas, e.g. nitrogen to remove the solvent, or alternatively applying a vacuum to remove solvent by vaporization. Conveniently temperatures of from 20° to 250°C are used during the removal of the solvent.

The final step in the method of the instant invention is the activation of the catalyst by reducing the ruthenium precursor to ruthenium metal. This may be done by means known in the art, preferably, however, the reduction will take place by contacting the solvent free catalyst with a hydrogen containing gas at a temperature of at least about 100°C, preferably from about 400° to about 500°C. The reduction is carried out until substantially all of the ruthenium precursor is converted to the metal.

PREFERRED EMBODIMENT

A monolith precovered with 10 wt. % alumina, having a surface area of between 1 and 50 meters$^2$/gram of monolith, is coated with mangesium oxide by either the aqueous impregnation of a magnesium oxide precursor or the use of a melt comprising magnesium nitrate hexahydrate, at conditions whereby upon subsequent calcination in oxygen at a temperature of about from 200° to 600°C, about 8 wt. % (based on the monolith weight) magnesium oxide is coated onto said alumina coated monolith. This magnesium coated monolith is contacted with an excess volume of ruthenium trichloride triahydrate dissolved in acetone. The acetone solution contains approximately 0.2 milligrams ruthenium per cm$^3$. The contacting of said monolith with said acetone solution is carried out in a container which closely matches the dimensions of the monolith to avoid poor distribution of the ruthenium on the exterior of the monolith. The volume of the acetone solution is adjusted so as to completely cover the monolith in said container. The acetone solution is contacted with the monolith at ambient pressure and temperature for a time sufficient for the brown ruthenium containing solution to become clear. The monolith is removed from the solvent and the excess solvent remaining in the pores is removed by purging with an inert gas, for example, nitrogen. The monolith is then reduced to convert the ruthenium trichloride which is adsorbed onto said monolith to the metal by contact with a hydrogen containing gas comprising approximately 15% hydrogen in an inert gas at a temperature steadily increasing from room temperature to about 400°C for a time sufficient to convert the ruthenium to the metal. Ruthenium dispersion as measured by standard chemisorption techniques indicates the ruthenium to be greater than 80% dispersed following reduction. Upon anaylsis of the remaining solvent in a container, it is found that no ruthenium remains in the solution.

EXAMPLE 1

A ruthenium catalyst on a monolith substrate was prepared as follows. The monolith had a 16.1 wt. % $Al_2O_3$ washcoat of ca. 200 $m^2$/gram alumina surface area (hence the surface area of the monolith was 32 $m^2$/gram) and was supplied by Corning Glass Works. The monolith was contacted with a saturated aqueous solution of $Mg(No_3)_2 6H_2O$. To insure uniform wetting of the entire monolith surface, the saturated liquid was poured down the monolith channels, and excess liquid was removed by blotting. The uptake into the pores of the monolith was 3.41 g of solution. The core was dried at 110°C overnight, and then calcined in flowing air for 16 hours at 600°C. The MgO concentration on the monolith following this calcination treatment was 1.78 wt. % MgO based on the total monolith weight. The calcined monolith was transferred to a nitrogen purged dry box in order to prevent rehydration or any other possible contamination of the washcoat surface. A 30 cc aliquot of a standard aqueous solution of 2.0 milligram ruthenium per centimeter cubed, as the salt $RuCl_3 3H_2O$ was contacted with the 600°C dehydrated 1 in. diameter by 3 in. length monolith under a nitrogen purge at ambient temperature. To insure uniform wetting of the entire monolith surface, the ruthenium solution was repeatedly poured through the monolith channels, and excess solution was removed by blotting. The monolith was then dried overnight at 110°C. Analysis by x-ray fluorescence established that this preparative procedure typically gave final catalysts containing ca. 0.1 wt. % Ru. The catalyst was reduced for one hour at 600°C with 15% $H_2$/85% Ar. The catalyst was then loaded into an adsorption cell, and re-reduced for 1 hr. at 480°C. with $H_2$. Carbon monoxide chemisorption gave a value of 72 $m^2$/g Ru or 16% dispersion for this catalyst preparation; i.e., 16% of the ruthenium atoms were in the surface of ruthenium particles. A measured surface area of 450 $m^2$/g ruthenium is defined as having 100% dispersion. It is assumed that one carbon monoxide molecule is chemisored per ruthenium surface atom to obtain the above metal surface area. This example is to be used for comparison to the anhydrous solution catalyst preparation technique employed in example 3.

EXAMPLE 2

Another ruthenium catalyst was prepared as in example 1 except for two changes in the preparative procedure. A 66 hr. freeze drying period under vacuum at −10°C was substituted for the overnight 110°C drying step at the point in the preparation following the contacting of the monolith with the saturated aqueous solution of $Mg(NO_3)_2 6H_2O$. An overnight freeze drying period at −10°C was also substituted for the overnight drying step at the point of the preparation following contacting of the core with the standard 2.0 mgRu $cm^3$ solution. Carbon monoxide chemisorption gave a value of 57 $m^2$/g Ru or 13% dispersion for this preparation. The catalyst was re-reduced in the chemisorption cell at 488°C for 1 hr. A second carbon monoxide chemisorption gave a value 57 $m^2$/g Ru or 13% dispersion, also. This second chemisorption was used to establish that the surface area value could be reproducibly obtained. This example serves to illustrate that a freeze drying procedure when an aqueous solution is employed in the ruthenium precursor deposition gives a ruthenium nearly the same as example 1. This example is to be used for comparison to the anhydrous solution catalyst preparation technique employed in example 3.

EXAMPLE 3

A procedure analogous to example 1 was employed to give an alumina washcoat monolith with 2.82 wt. % MgO based on the total monolith weight. The 600°C calcined monolith was transferred to a dry box under a nitrogen purge. The monolith was cooled to ambient temperature and immersed in 40 cc anhydrous acetone containing 6.7 mg ruthenium as $RuCl_3 3H_2O$. The monolith was immersed in the acetone solution in a graduated cylinder chosen so that a close fit of the monolith with the cylinder wall was obtained. A 40 cc quantity of acetone containing 6.7 mg Ru as $RuCl_3·3-H_2O$ was chosen as this was the amount which would just cover the monolith in the graduated cylinder. After immersion of the monolith in the acetone solution, the cylinder was agitated to remove any nitrogen gas pockets within the monolith channels. Complete adsorption occurred to give uniform distribution over several hours, as observed visually, but the contacting with the acetone solution was continued for an overnight period. This gave a catalyst containing 0.03 wt. % Ru based on the total monolith weight. Analysis of the ruthenium remaining in the acetone solution by x-ray fluorescence demonstrated that greater than 94% of the ruthenium chloride was adsorbed onto the monolith. The monolith was removed from the graduated cylinder and the acetone was removed by pulling nitrogen from the nitrogen purged dry box through the monolith by use of a large sintered glass funnel connected to an external vacuum pump. Removal of acetone was monitored by weighing the monolith in the dry box. The monolith was then loaded into an adsorption cell and reduced for one hour at 480°C in $H_2$, every precaution was taken to prevent any rehydration of the washcoat prior to reduction. Carbon monoxide chemisorption gave a value of 560 $m^2$/g Ru or 132% dispersion. Some multiple chemisorption of carbon monoxide per surface ruthenium atom must be occurring to account for the dispersion being greater than 100 percent. This example demonstrates the superior ruthenium dispersion obtained for an anhydrous acetone adsorption preparation compared to the aqueous preparations of examples 1 and 2.

EXAMPLE 4

A procedure analogous to example 3 was employed to prepare a ruthenium catalyst on a monolith substrate except for substitution of a 50:50 volume ratio of water-acetone for anhydrous acetone as the $RuCl_3 3H_2O$ containing adsorption solution. Over a period of several hours ruthenium precipitation as large aggregates in the solution occurred. In addition, the ruthenium chloride which did adsorb onto the monolith was visually observed to be poorly distributed in irregular patches on the monolith surface. This example serves to demonstrate the adverse effects of water on an adsorption preparation of ruthenium chloride onto a magnesia on alumina washcoated monolith. This example demonstrates the advantages of a non-aqueous adsorption preparation analogous to example 3 where the ruthenium is deposited in a uniform fashion on the washcoat surface. This example also demonstrates that ruthenium chloride will react with an aqueous phase in contact with a magnesia on alumina washcoated monolith to give insoluble products. This precipitation precludes an adsorption preparation where a specific concentrate of ruthenium will be deposited uniformly on the monolith substrate.

EXAMPLE 5

Preparation of a 0.3 wt. % Ru on MgO power catalyst was accomplished by impregnation to the point of incipient wetness using an aqueous solution of $RuCl_3$-$H_2O$ of appropriate concentration. The catalyst was dried overnight at 110°C. The catalyst was pilled to 10–20 mesh and charged to an adsorption cell. The catalyst was reduced for 1 hr. at 480°C in $H_2$. The hydrogen and carbon monoxide chemisorption values were then obtained on this catalyst sample. These two techniques were employed to determine metal surface area were found to be in excellent agreement; 170 $m^2/g$ Ru for hydrogen and 192 $m^2/g$ for carbon monoxide chemisorption. These metal dispersions are 38 and 42 percent, respectively. This example is to be used for comparison to the anhydrous solution catalyst preparation technique of example 6.

EXAMPLE 6

Preparation of 0.3 wt. % Ru on MgO powder was accomplished by adsorption of $RuCl_3 3H_2O$ from anhydrous acetone. The acetone solution was decanted following an overnight adsorption period. The overnight adsorption period was employed to complete adsorption of any trace quantities of ruthenium chloride remaining in solution. Adsorption of 15 mg Ru as $RuCl_3 3H_2O$ onto 5 g MgO powder was visually observed to be essentially completed over a several hour period. The acetone was removed by evacuation. The decanted acetone solution was evaporated to dryness and x-ray fluorescence ruthenium analysis of the residue indicated greater than 94% ruthenium adsorption onto the MgO powder from the acetone solution. Carbon monoxide chemisorption was obtained for this catalyst and the value of 453 $m^2/g$ Ru cc or 100 percent dispersion was obtained. This example demonstrates the superior ruthenium dispersion obtained for an anhydrous acetone adsorption preparation on powdered MgO compared to the aqueous preparation of example 5.

What is claimed is:

1. A process for preparing catalysts comprising ruthenium supported on a porous, Group IIA oxide, said catalyst being characterized as having said ruthenium in high surface area, which comprises adsorbing a ruthenium precursor from a nonaqueous solvent selected from the group consisting of aldehydes, ketones, ethers and organic nitrogen bases, said nonaqueous solvent being present in a volume in excess of the volume necessary to fill the pores of said Group IIA oxide, removing said nonaqueous solvent, and reducing said ruthenium precursor substantially to ruthenium metal.

2. The process of claim 1 wherein said Group IIA oxide is magnesium oxide.

3. The process of claim 1 wherein said non-aqueous solvent is selected from the group consisting of acetone, acetonitrile, N,N-dimethyl formamide, hexamethyl phosphoramide, diethylether, tetrahydrofuran, dioxane, methylethyl ketone, and acetaldehyde.

4. The process of claim 2 wherein said magnesium oxide is supported on an alumina wash-coated monolith.

5. The process of claim 4 wherein said contacting takes place in a container which closely matches the dimensions of the monolith and said monolith is completely submerged in said nonaqueous solvent.

6. The process of claim 5 wherein said solvent is acetone.

7. The process of claim 6 wherein said monolith has a surface area of from 1 to 50 $meters^2/gram$.

8. The process of claim 7 wherein said ruthenium precursor is reduced to the metal in a hydrogen containing gas at temperatures of at least about 100°C.

9. The process of claim 8 wherein said ruthenium metal has a dispersion of from 50 to 100 percent.

* * * * *